Fig. 1.

Jan. 6, 1953　　　　H. HOGEMAN　　　　2,624,327
FUEL INJECTION APPARATUS
Filed March 30, 1950　　　　　　　　　　　　7 Sheets-Sheet 2

INVENTOR.
HANS HOGEMAN
BY
ATTORNEY

Jan. 6, 1953     H. HOGEMAN     2,624,327
FUEL INJECTION APPARATUS Filed March 30, 1950                                       7 Sheets-Sheet 3

Fig. 3.

INVENTOR.
HANS HOGEMAN
BY *Raymond A. Paquin*
ATTORNEY

Fig. 5.

Jan. 6, 1953 H. HOGEMAN 2,624,327
FUEL INJECTION APPARATUS
Filed March 30, 1950 7 Sheets-Sheet 7

INVENTOR.
HANS HOGEMAN
BY Raymond A. Paquin
ATTORNEY

Patented Jan. 6, 1953

2,624,327

UNITED STATES PATENT OFFICE 2,624,327

FUEL INJECTION APPARATUS

Hans Hogeman, Longmeadow, Mass., assignor to American Bosch Corporation, Springfield, Mass., a corporation of New York Application March 30, 1950, Serial No. 152,967

12 Claims. (Cl. 123—140)

1

This invention relates to fuel injection apparatus and has particular reference to a new and improved fuel injection pump.

An object of the invention is to provide new and improved timing means for a fuel injection pump.

Another object of the invention is to provide a new and improved fuel injection pump employing a single plunger and distributing means for delivering fuel to a plurality of outlets and a single timing means for timing the injections of all of the outlets.

Another object is to provide a fuel injection pump having new and improved timing means which can be either manually or automatically controlled.

Another object is to provide a new and improved injection timing arrangement for a fuel injection pump of the sleeve control type.

Another object is to provide a fuel injection pump having sleeve control means for both the fuel quantity and timing of injection.

Other objects and advantages of the invention will be apparent from the following description taken in connection with the accompanying drawings which set forth the preferred form of the invention by way of illustration only.

Referring to the drawings.

Referring more particularly to the drawings wherein similar reference characters designate corresponding parts throughout, the apparatus shown embodying the invention, some features of which are described in detail in the application of Hogeman and Coe, Serial Number 77,405.

Figure 1:
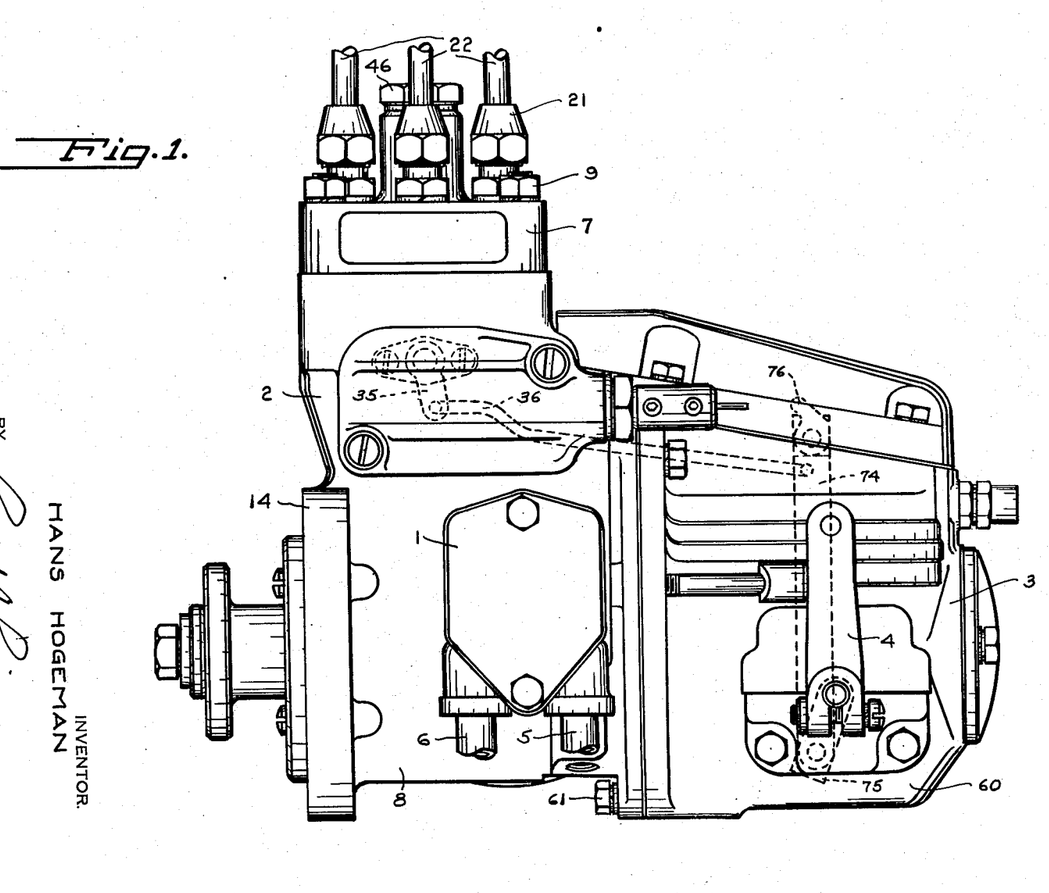
Fig. 1 is a side view of a fuel supply apparatus embodying the invention.
Figure 2:
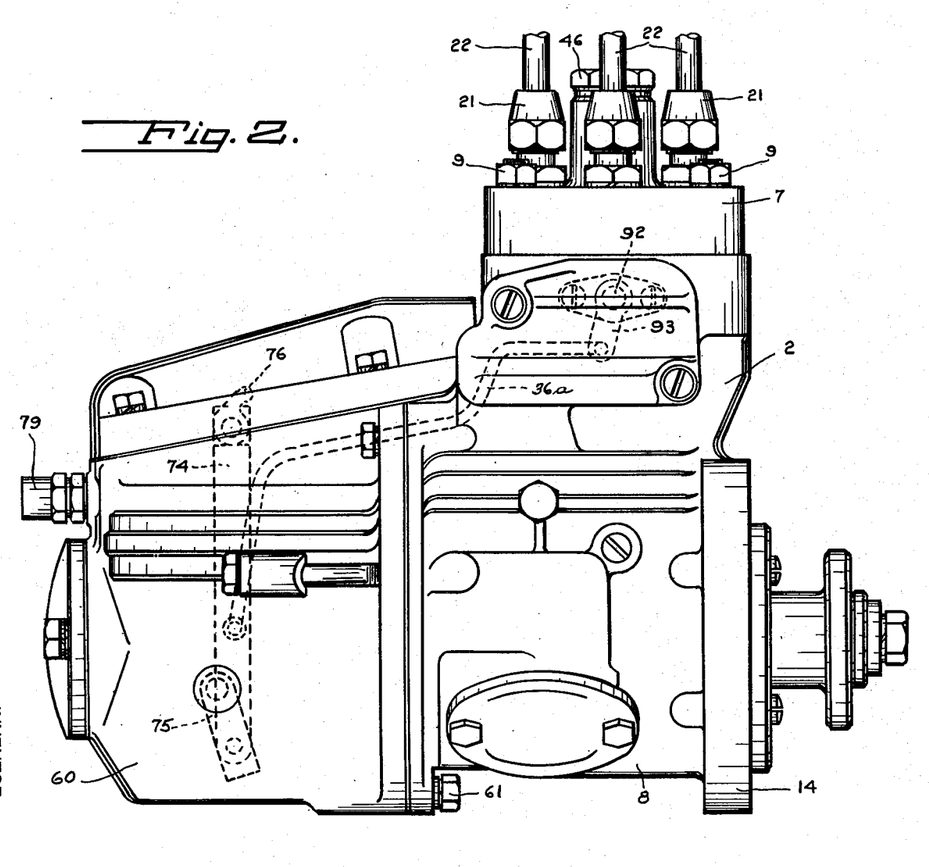
Fig. 2 is a side view thereof showing the opposite side of the apparatus.
Figure 3:
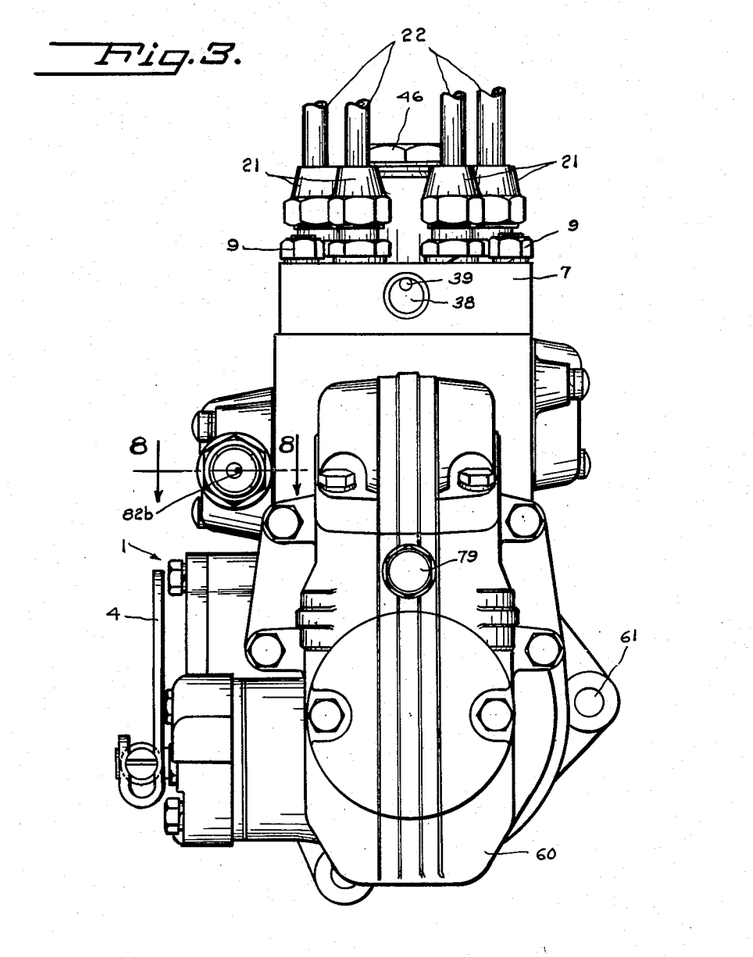
Fig. 3 is an end view of the apparatus shown in Figs. 1 and 2.
Figure 4:
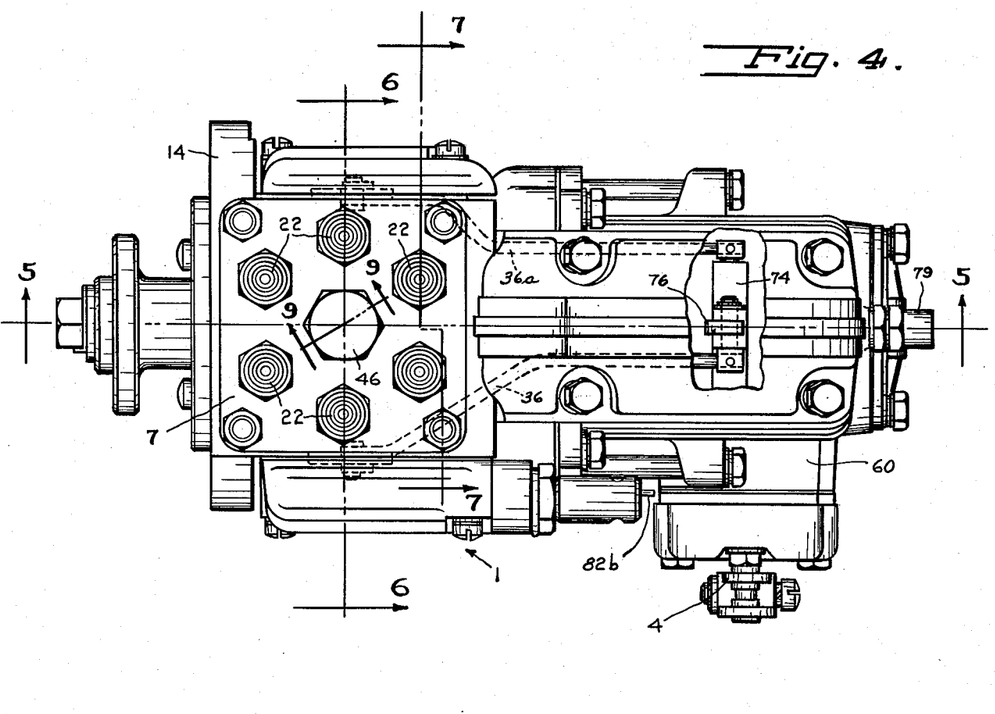
Fig. 4 is a top or plan view thereof.
Figure 5:
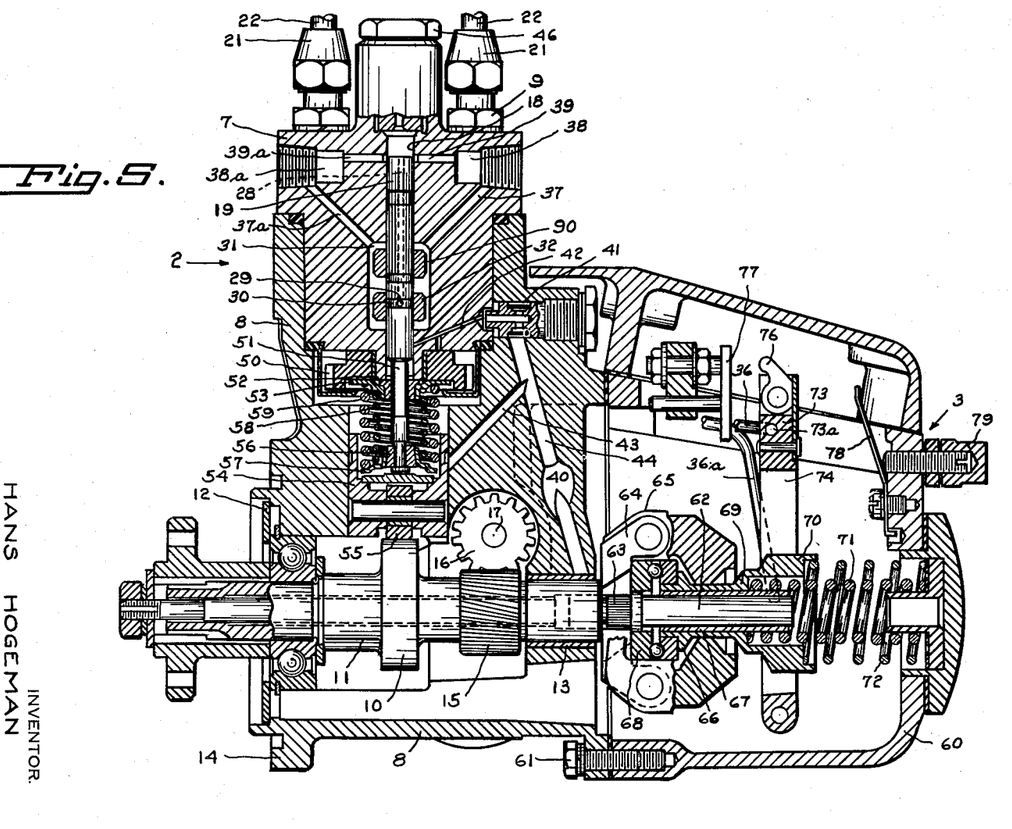
Fig. 5 is a sectional view taken on line 5—5 of Fig. 4 looking in the direction of the arrows.
Figures 6, 9, 10:
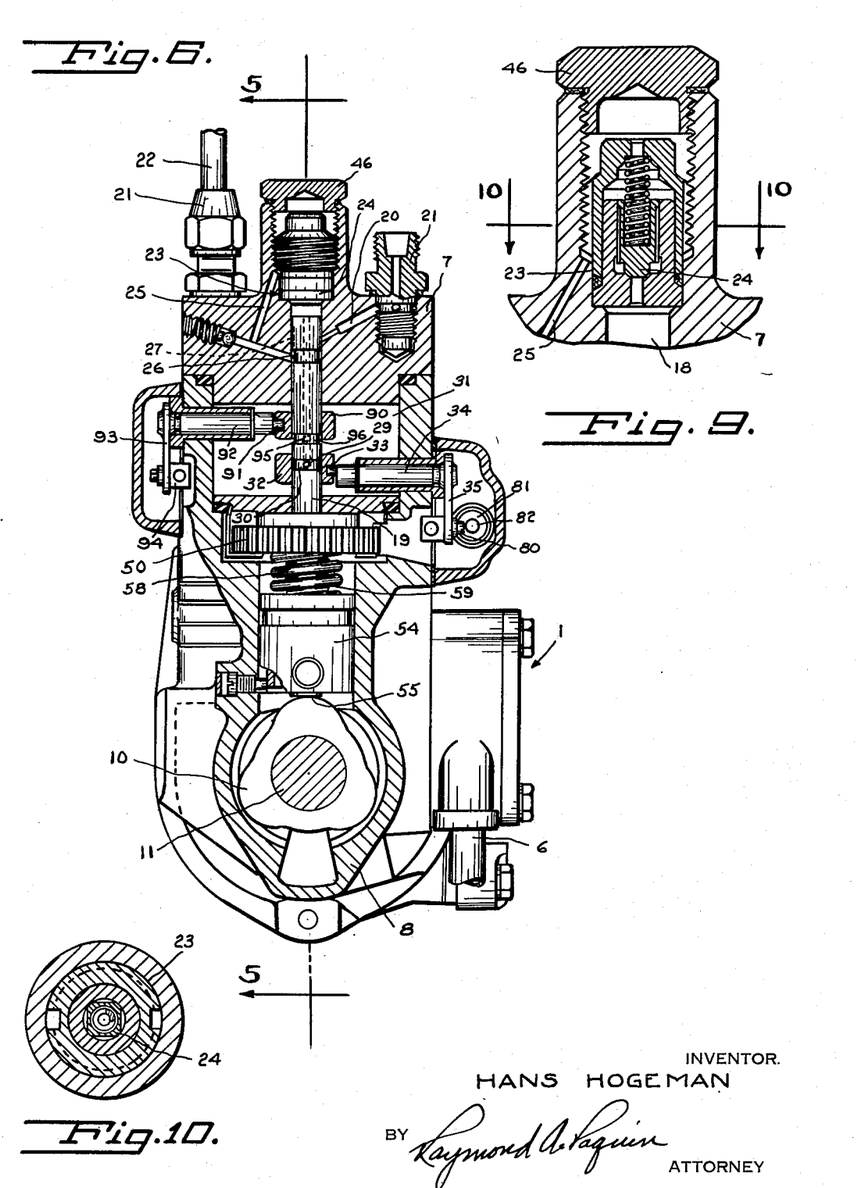
Fig. 6 is a sectional view taken on line 6—6 of Fig. 4 looking in the direction of the arrows.
Fig. 9 is a fragmentary sectional view taken on line 9—9 of Fig. 4 looking in the direction of the arrows.
Fig. 10 is a sectional view taken on line 10—10 of Fig. 9 looking in the direction of the arrows.
Figure 7:
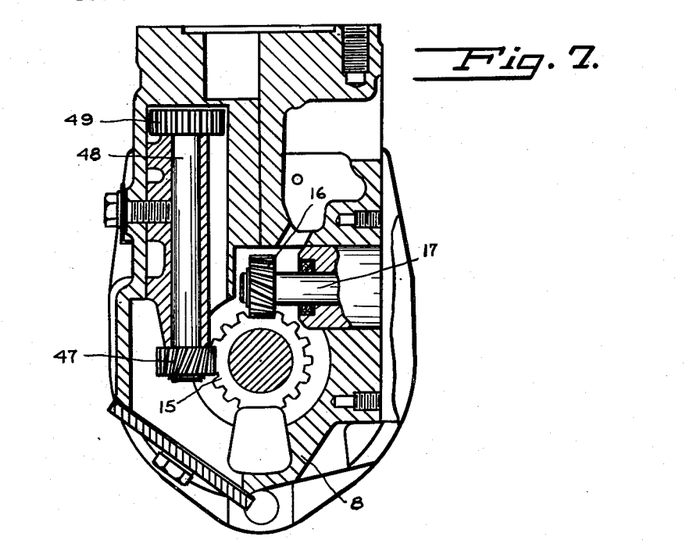
Fig. 7 is a fragmentary sectional view taken on line 7—7 of Fig. 4 looking in the direction of the arrows.
Figure 8:
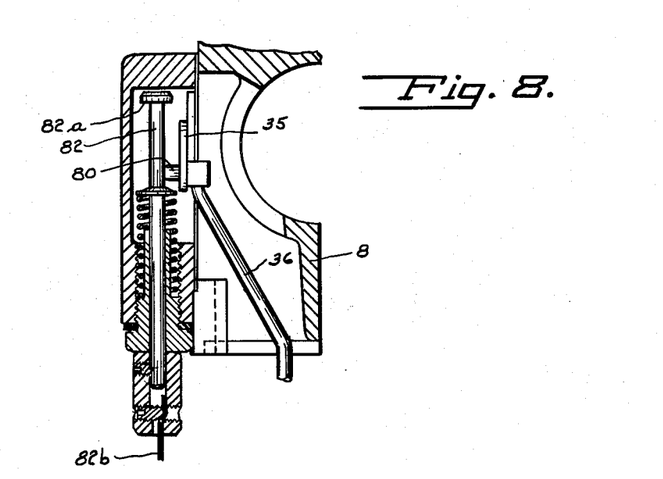
Fig. 8 is a fragmentary sectional view taken on line 8—8 of Fig. 3 looking in the direction of the arrows.

2 which issued on August 15, 1950, as Patent No. 2,518,473, comprises a fuel supply pump 1, fuel injection pump 2 and governor 3 secured together to form a single, relatively small and compact unit which may be mounted on or removed from the engine as a complete unit.

The fuel supply pump 1 may be a conventional gear type supply pump or other satisfactory form of supply pump. If desired, the fuel supply pump 1 may be a completely separate unit having a fuel supply line connected to the fuel injection pump for supplying fuel thereto instead of being mounted directly on the fuel injection pump unit as shown. The supply pump 1 is adapted to receive fuel from a fuel supply tank, not shown, through line 5 and after being pumped to desired pressure by supply pump 1 is delivered to fuel injection pump 2 through line 6 which is connected to fuel inlet 38 of the fuel injection pump 2.

The fuel injection pump 2 includes the pump head 7 which fits into the main housing 8 and is secured thereto by bolts or the like 9.

The fuel injection pump 2 is adapted to be driven by the cam 10 on camshaft 11 which is connected to the engine and adapted to operate at one half engine speed or at engine speed, and the camshaft is, therefore, provided with a number of lobes equal to one-half the number of outlets where the pump operates at engine speed and the same number of lobes as outlets where it operates at one-half engine speed. For example, the pump shown has six outlets and the cam is, therefore, provided with three lobes which are adapted to reciprocate the plunger which makes two complete cycles for each rotation of camshaft 11 and cam 10.

The camshaft 11 is mounted for rotation adjacent its opposite ends on ball bearing 12 and bearing 13 respectively. Mounting flange 14 is provided for securing the pump assembly in position on the engine.

On camshaft 11 is provided helical gear 15 adapted to be rotated by camshaft 11 upon rotation thereof and said helical gear 15 meshes with helical gear 16 on shaft 17.

Pump head 7 contains bore 18 in which plunger 19 is mounted for reciprocation and rotation. Bore 18 is connected by a series of outlet ducts or ports 20, each of which connects bore 18 with its respective outlet 21, each of which is connected by a conduit or line 22 to a respective cylinder of the engine.

On pump head 7 and aligned with bore 18 is provided the chamber 23 in which is positioned the discharge or check valve 24 for controlling the discharge of fuel from bore 18 and after said fuel passes through check or discharge valve 24 which may be of conventional type, it passes through supply groove 25 to the annular fuel receiving groove 26 in plunger 19 on each stroke of plunger 19 and from groove 26 the fuel passes to distributing groove 27 which is adapted to communicate with each of the outlet ports 20 successively upon reciprocation and rotation of plunger 19.

Plunger 19 is provided with an axial hole 28 which extends from the upper end of plunger 19 and terminates in spill port 29 which communicates with annular spill groove 30 on plunger 19.

Pump head 7 is provided with chamber 31 which is both a spill and timing chamber and in chamber 31 is positioned sleeve 32 which is adjustable and controls the quantity of fuel to be delivered. Sleeve 32 surrounds plunger 19 adjacent port 29 and said sleeve 32 is adjustable axially of plunger 19 by means of eccentric pin 33 on rotatable shaft 34 which is connected by pivoted lever 35 and link 36 to governor 3.

Spill chamber 31 is connected by port 37 with supply port 38 to which is connected the supply line 6 from fuel supply pump 1 and said fuel passes through port 39 to bore 18. Port 37a is connected to port 38a to which is connected a return fuel line having an overflow valve therein, not shown, to maintain the desired fuel supply pressure in the pump.

Also within chamber 31 is positioned a second or timing sleeve 90 which also surrounds plunger 19 and which is also adjustable axially of plunger 19 by means of eccentric pin 91 on shaft 92 which is connected by pivoted lever 93 to link 94 which may be connected to the governor 3 by lever 36a as hereinafter described or manually operated if desired.

Plunger 19 is provided with port 95 which connects said axial hole 28 with annular timing groove 96 adapted to be controlled by timing sleeve 90 to control the timing of injections by the pump as hereinafter described.

Timing sleeve 90 is adjustably connected to governor 3 through eccentric pin 91, shaft 92, lever 93, link 94 and lever 36a, as previously described whereby both timing sleeve 90 and fuel quantity control sleeve 32 are simultaneously automatically adjusted as a unit in the same direction to the same extent to change the injection period to a different cam position and by this means earlier or later timing of the injection may be automatically obtained.

For lubrication of the pump, the passageway 40 is provided through which part of the lubricating oil passes through filter 41 from which it passes through duct 42 to the lower portion of bore 18 and the remainder of the lubricating oil passes from opening 40 through ducts 43 and 44 to lubricate tappet 54 and bearing respectively.

The threaded plug 46 is provided for sealing the upper end of chamber 23 and this plug is removable to allow replacement of discharge valve 24.

Fuel supply pump 1 is adapted to be operated by shaft 17 to which is secured helical gear 16 adapted to be rotated by helical gear 15 on camshaft 11 as previously described.

Gear 47 on shaft 48 also meshes with gear 15 and is adapted to be rotated thereby and rotation of shaft 48 rotates gear 49 which is fixed on the end of said shaft opposite helical gear 47 and said gear 49 meshes with gear 50 for rotating plunger 19.

Plunger 19 has the flat sided extension 51 which is keyed with gear 50 through member 52 and spring seat 53, therefore, rotation of gear 50 as previously described will effect simultaneous rotation of plunger 19. Tappet 54 is provided with roller 55 which engages cam 10 on camshaft 11 whereby, upon rotation of camshaft 11, the lobes of cam 10 will force the plunger 19 in a direction away from the axis of the cam 10, that is, in the direction of the pumping stroke of plunger 19.

The adjacent end of plunger 19 is secured to wedge-shaped member 56 over which fits spring seat 57. Coil springs 58 and 59 are provided for moving plunger 19 on its return stroke and said springs 58 and 59 have their opposite ends engaging spring seats 53 and 57 with the spring 58 being of smaller diameter than spring 59 and positioned within said spring 59.

The governor 3 is positioned within casing 60 which is secured to the main pump housing 8 by means of bolts 61 or other suitable means. Governor shaft 62 is keyed to camshaft 11 and adapted to rotate therewith.

Governor shaft 62 has a serrated portion 63 and a spider 64 is rigidly mounted upon the serrated portion 63 of shaft 62. This spider 64 supports the governor weights 65 which are pivotally mounted thereon and each of said weights has a portion which contacts flange 66 on sleeve 67 through ball bearing 68. Sleeve 67 is mounted for longitudinal movement upon governor shaft 62 and at its opposite end from flange 66 is provided with flanges 69 and 70 forming seats for springs 71 and 72 respectively.

A governor lever 73 is provided in the form of a yoke 74, the forks of which extend around governor shaft 62 and each fork is pivotally mounted on lever 75 which is pivotally mounted on flange 70 on the end of sleeve 67. Link 36 is connected to lever 73 at 73a.

Governor lever 73 is provided with cam 76 which is adapted to engage plate 77 which is so adjusted that cam 76 just touches plate 77 at full speed and full load.

Spring member 78 and adjustable surge screws 79 are provided for steadying engine performance in case of any surging.

The pivoted lever 35 is provided with a projecting pin 80 adapted to engage and be moved by a shoulder 82a on spring pressed shaft 82 to shut off the pump and thereby shut off the engine.

In the operation of the device, fuel supply pump 1 receives fuel from the supply tank through inlet line 5 and pumps the fuel to desired pressure and supplies fuel through outlet line 6 to inlet 38 of the fuel injection pump 2 and said fuel then passes through port 39 to bore 18, and also fills ports 39a and 38a, and due to the overflow valve in the line connected to port 38a, the desired fuel pressure is maintained in the fuel injection pump. The arrangement described is employed in the case where the fuel supply pump is of the gear type. Where other forms of supply pumps are employed, such as a diaphragm pump, the overflow valve and return line from port 38a to the fuel supply tank are not needed and, in such cases port 38a may be closed by a plug.

The supply of fuel in ports 39 and 39a is maintained at all times and on the downward or return stroke of the plunger 19 fuel enters bore 18. This return stroke of plunger 19 is effected by springs 58 and 59 and the pumping stroke of plunger 19 is effected by the lobes of cam 10 which engage roller 55 on tappet 54 and upon rotation of camshaft 11, tappet 54 is moved away from the camshaft and plunger 19 which is carried thereby is automatically moved with tappet 54 to effect the pumping stroke of the plunger.

During the pumping stroke of the plunger 19, when the pressure of fuel in bore 18 above the plunger is sufficient to overcome the force of the spring in the discharge or delivery valve 24, that valve is lifted off its seat and fuel is forced through said valve to duct 25 from which it passes to annular fuel receiving groove 26 on plunger 19 from which it passes to distributing groove 27 by which it is delivered to the various outlets 20 successively as said groove 27 becomes aligned with each of said outlets upon reciprocation and rotation of said plunger.

Fuel in bore 18 flows into the axial hole 28 in plunger 19 and is spilled through spill port 29 into spill chamber 31. The time of the injection depends upon the position of sleeves 32 and 90 which are connected to governor yoke 74 by links 36 and 36a respectively and is controlled by adjustment of said sleeves 32 and 90 along plunger 19 simultaneously as a unit in a direction parallel to the axis of the plunger 19.

This moving of sleeves 32 and 90 as a unit simultaneously and to the same extent shifts the injection period which can thereby be varied as desired.

Adjustment of sleeve 32 alone, without adjustment of sleeve 90, controls the quantity of fuel to be delivered through the delivery valve 24 before the fuel pressure in bore 18 is relieved by spilling through spill port 29 as previously described, which spilling relieves the pressure of fuel in bore 18 until it is so reduced that the force of the delivery valve spring is sufficient to return the valve to its seat thereby preventing further delivery of fuel to duct 25 until the next pumping stroke of plunger 19.

Adjustment of quantity control sleeve 32 is automatically effected by rotation of shaft 34 by lever 35 and link 36 which is connected to the governor for automatic control.

During each pumping stroke of plunger 19 it is rotated by gear 15 through gear 47, shaft 48, gear 49 and gear 50 as previously described to thereby align groove 27 with the circumferentially spaced outlet ports 20 in bore 18.

From the foregoing it will be seen that I have provided simple, efficient and economical means for obtaining all of the objects and advantages of the invention.

Having described my invention, I claim:

1. In a device of the character described, a bore, a plunger in said bore, a spill groove in said plunger, a quantity control member surrounding said plunger, a separate injection timing member surrounding said plunger and means whereby said quantity control member and said timing member may be independently adjusted or simultaneously adjusted to adjust the injection timing of the pump.

2. In a device of the character described, a bore, a plunger in said bore, a spill groove in said plunger, a quantity control member surrounding said plunger, a separate, independently adjustable injection timing member surrounding said plunger and automatic means for simultaneously adjusting said quantity control member and said timing member to adjust the injection timing of the pump.

3. In a fuel injection pump, a bore, fuel supply and delivery means communicating with said bore, a plunger in said bore, said plunger having spill and timing ports and a pair of separate, independently longitudinally adjustable sleeve members cooperating with said spill and timing ports for controlling the quantity of fuel injected and the timing of injection by the pump.

4. In a fuel injection pump, a bore, fuel supply and delivery means communicating with said bore, a plunger in said bore, said plunger having spill and timing ports and a pair of separate, independently longitudinally adjustable sleeve members cooperating with said spill and timing ports and means for automatically adjusting said sleeve members for controlling the quantity of fuel injected and the timing of injection by the pump.

5. In a fuel injection pump, a bore, fuel supply and delivery means communicating with said bore, a plunger in said bore, said plunger having spill and timing ports and a pair of separate, independently adjustable sleeve members cooperating with said spill and timing ports and means for adjusting said sleeve members for controlling the quantity of fuel injected and the timing of injection by the pump.

6. In a fuel injection pump, a bore, fuel supply and delivery means communicating with said bore, a plunger in said bore, said plunger having spill and timing ports, a longitudinally adjustable sleeve member cooperating with said spill port for controlling the quantity of fuel delivered by the pump and a separate, independently longitudinally adjustable sleeve member cooperating with said timing port for controlling the timing of injection by the pump.

7. In a fuel injection pump, a bore, fuel supply and delivery means communicating with said bore, a plunger in said bore, said plunger having spill and timing ports, an adjustable sleeve member cooperating with said spill port for controlling the quantity of fuel delivered by the pump and a separate, independently adjustable sleeve member cooperating with said timing port and means for adjusting said spill controlling sleeve and said timing sleeve for controlling the timing of injection by the pump.

8. In a fuel injection pump, a bore, fuel supply and delivery means communicating with said bore, a plunger in said bore, said plunger having spill and timing ports, an adjustable sleeve member cooperating with said spill port for controlling the quantity of fuel delivered by the pump and a separate, independently adjustable sleeve member cooperating with said timing port, governor means for automatically controlling said sleeves for controlling the quantity of fuel delivered and for controlling the timing of injection by the pump.

9. In a fuel injection pump, a bore, fuel supply and delivery means communicating with said bore, a plunger in said bore, said plunger having spill and timing ports, a longitudinally adjustable sleeve member cooperating with said spill port for controlling the quantity of fuel delivered by the pump and a separate, independently adjustable sleeve member cooperating with said timing port, governor means and means connecting said sleeves to said governor for automatic control thereby for automatically controlling the quantity of fuel delivered and for controlling the timing of injection by the pump.

10. In a device of the character described, a fuel injection pump having a bore, fuel supply and delivery means communicating with said bore, a plurality of outlets communicating with said bore, a plunger in said bore having a pumping portion and a distributing portion, an axial opening in said plunger, a spill port and a timing port communicating with said axial opening, a longitudinally adjustable sleeve surrounding said plunger and cooperating with said spill port to control the quantity of fuel delivered by the pump and a separate, independently adjustable sleeve surrounding said plunger and cooperating with said timing port to control the timing of injection by the pump.

11. In a device of the character described, a fuel injection pump having a bore, fuel supply and delivery means communicating with said bore, a plurality of outlets communicating with said bore, a plunger in said bore having a pumping portion and a distributing portion, an axial opening in said plunger, a spill port and a timing port communicating with said axial opening, a longitudinally adjustable sleeve surrounding said plunger and cooperating with said spill port to control the quantity of fuel delivered by the pump and a separate, longitudinally adjustable sleeve surrounding said plunger and cooperating with said timing port to control the timing of injection by the pump, said sleeves being independently adjustable, a governor and means connecting said sleeves to said governor for automatic control thereby.

12. In a device of the character described, a fuel injection pump having a bore, fuel supply and delivery means communicating with said bore, a plurality of outlets communicating with said bore, a plunger in said bore having a pumping portion and a distributing portion, an axial opening in said plunger, a spill port and a timing port communicating with said axial opening, a longitudinally adjustable sleeve surrounding said plunger and cooperating with said spill port to control the quantity of fuel delivered by the pump and a separate, longitudinally adjustable sleeve surrounding said plunger and cooperating with said timing port to control the timing of injection by the pump and means for independently adjusting said spill control sleeve to control the quantity of fuel delivered and for adjusting both said sleeves to adjust the timing of the pump.

HANS HOGEMAN.

REFERENCES CITED

The following references are of record in the file of this patent:

UNITED STATES PATENTS

| Number | Name | Date |
|---|---|---|
| 1,819,015 | Benes | Aug. 18, 1931 |
| 2,147,390 | Vaudet | Feb. 14, 1939 |
| 2,410,773 | Chandler | Nov. 5, 1946 |
| 2,413,115 | Sheehan | Dec. 24, 1946 |

FOREIGN PATENTS

| Number | Country | Date |
|---|---|---|
| 359,603 | Great Britain | Oct. 29, 1931 |
| 373,286 | Great Britain | May 26, 1932 |